United States Patent
Masaki (10) Patent No.: US 8,625,585 B2
(45) Date of Patent: Jan. 7, 2014

(54) SWITCH APPARATUS (75) Inventor: Atsushi Masaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 151 days.

(21) Appl. No.: 13/032,095

(22) Filed: Feb. 22, 2011

(65) Prior Publication Data

US 2011/0222533 A1  Sep. 15, 2011

(30) Foreign Application Priority Data

Mar. 9, 2010 (JP) ................. 2010-051823

(51) Int. Cl.
*H04L 12/50* (2006.01)

(52) U.S. Cl.
USPC ........... 370/357; 370/252; 370/230; 711/154; 710/316

(58) Field of Classification Search
USPC ........... 370/357, 230, 252; 710/316; 711/154
See application file for complete search history.

(56) References Cited

U.S. PATENT DOCUMENTS

| | | | |
|---|---|---|---|
| 5,274,633 A | 12/1993 | Kato et al. | |
| 2002/0107980 A1 | 8/2002 | Kawaguchi | |
| 2004/0100927 A1* | 5/2004 | Black et al. | 370/335 |
| 2005/0027919 A1* | 2/2005 | Aruga | 710/316 |
| 2007/0208758 A1* | 9/2007 | Yeap et al. | 707/100 |
| 2008/0276086 A9* | 11/2008 | Proudler | 713/165 |

FOREIGN PATENT DOCUMENTS

| | | |
|---|---|---|
| JP | 2000/228671 | 8/2000 |
| JP | 2002/229965 | 8/2002 |
| JP | 2004/086367 | 3/2004 |
| JP | 2004/282293 | 10/2004 |
| JP | 2005-539284 | 12/2005 |
| WO | WO 91/08632 | 6/1991 |
| WO | WO 03/061222 | 7/2003 |

OTHER PUBLICATIONS

Japanese Office Action issued on Sep. 24, 2013 in copending Japanese Patent Application No. 2010-051823.

* cited by examiner

*Primary Examiner* — Man Phan
*Assistant Examiner* — Mewale Ambaye
(74) *Attorney, Agent, or Firm* — Staas & Halsey LLP

(57) ABSTRACT

A switch apparatus includes: a first switch circuit for receiving data from external, sending first data including the received data, and sending second data including the received data after a predetermined time period from sending of the first data; a first controller for outputting the first data received from the first switch circuit; a second controller for outputting the second data received from the first switch circuit; and a second switch circuit for receiving the first data from the first controller and second data received from the second controller, sending the first data to external when the first data is free from an error, and sending the second data to external when the first data has an error and when the second data is free from an error.

6 Claims, 7 Drawing Sheets

SWITCH APPARATUS

CROSS-REFERENCE TO RELATED APPLICATION

This application is based upon and claims the benefit of priority of the prior Japanese Patent Application No. 2010-051823 filed on Mar. 9, 2010, the entire contents of which are incorporated herein by reference.

FIELD

The embodiments discussed herein are related to switch apparatuses for transferring data and to control methods for the switch apparatuses.

BACKGROUND

Switch apparatuses are used for transferring data between a plurality of server apparatuses and a plurality of storage apparatuses so that the server apparatuses share the storage apparatuses and data-backup is performed with higher reliability.

Such a switch apparatus includes a plurality of transmission paths for receiving data from any of the server apparatuses and sending the received data to any of the storage apparatuses. The data received by the switch apparatus from the server apparatuses are sent to the transmission paths in the switch apparatus via port modules included in the switch apparatus. The port module is a switch circuit for switching a connection between the transmission path in the switch apparatus and an external apparatus.

The port module sends and receives data. The port module having received data from the external apparatus sends the data to a controller in the switch apparatus. Based on information included in the data received from the port module, the controller sends the data to a port module connected to a destination apparatus. The switch apparatus includes a plurality of controllers. The port module selects one of the controllers, and sends data thereto. Thus, a plurality of transmission paths are present between one port module and another port module.

The port module having data received from the controller sends the data to the storage apparatus connected to the port module.

In the case where a plurality of controllers are present in the switch apparatus, even when one of the controllers fails, the switch apparatus can continue a data sending/receiving process with use of another one of the controllers. However, when the controllers themselves fail during the data sending/receiving, the data being sent/received at the time of failure occurrence are destroyed.

Japanese Laid-open Patent Publication No. 2005-539284 and International Publication Pamphlet No. 91/08632 below each disclose a technology of propagating a signal in a redundant system.

SUMMARY

According to an aspect of the embodiment, a first switch circuit for receiving data from external, sending first data including the received data, and sending second data including the received data after a predetermined time period from sending of the first data; a first controller for outputting the first data received from the first switch circuit; a second controller for outputting the second data received from the first switch circuit; and a second switch circuit for receiving the first data from the first controller and second data received from the second controller, sending the first data to external when the first data is free from an error, and sending the second data to external when the first data has an error and when the second data is free from an error.

DESCRIPTION OF EMBODIMENTS

In the following, description is made of an embodiment of the present invention. Combinations of structures according to the embodiment are included in the embodiment of the present invention.

Figure 1:
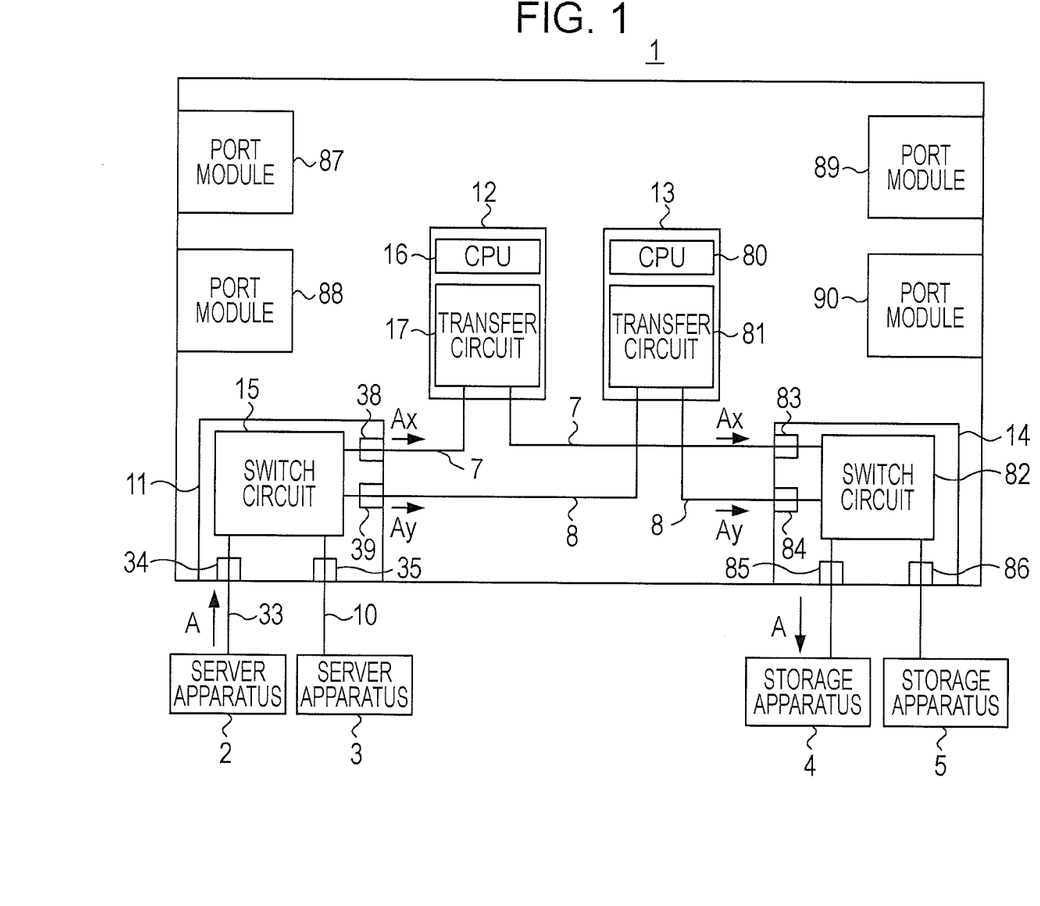
FIG. 1 is a block diagram of a switch apparatus.

FIG. 1 is a block diagram of a switch apparatus 1 according to the embodiment of the present invention. For example, based on header information of data received at one port module, the switch apparatus 1 performs switching to another port module to send the data.

The switch apparatus 1 includes port modules 11, 14, 87, 88, 89, and 90, and controllers 12 and 13. Each of the port modules 11, 14, 87, 88, 89, and 90 sends data received from external of the switch apparatus 1 to another port module, and sends data received from another port module to external of the switch apparatus 1. Server apparatuses and storage apparatuses are connected to the port modules 11, 14, 87, 88, 89, and 90. The port modules are connected to each other through the controllers 12 and 13. FIG. 1 illustrates a connection state between the port module 11 and the port module 14, and illustration of communication states between other port modules is omitted. The switch apparatus 1 includes two or more port modules and two or more controllers. The port modules and the controllers are replaceable by insertion and removal. Each of the port modules 11, 14, 87, 88, 89, and 90 has the same structure and the same functions. Thus, in this embodiment, detailed description is only made of the port modules 11 and 14, and description of the other port modules is omitted.

In this embodiment, server apparatuses 2 and 3 are connected to the port module 11, and storage apparatuses 4 and 5 are connected to the port module 14. The port modules 11 and 14 are connected to each other through two transmission paths 7 and 8. The transmission path 7 is via the controller 12, and the transmission path 8 is via the controller 13. The switch apparatus 1 sends data received from the server apparatus 2 or 3 to the storage apparatus 4 or 5. Also, the switch apparatus 1 sends data received from the storage apparatus 4 or 5 to the server apparatus 2 or 3.

The port module 11 includes external ports 34 and 35, internal ports 38 and 39, and a switch circuit 15. The external ports 34 and 35 are ports for connecting external apparatuses external to the switch apparatus 1 and the port module 11 to each other. The external port 34 is connected to the server apparatus 2 via a transmission path 33. The external port 35 is connected to the server apparatus 3 via a transmission path 10. The data received through the external ports are detected by the switch circuit 15.

The internal ports 38 and 39 are ports for connecting the port module 11 and the controllers 12 and 13 to each other in the switch apparatus 1. The internal port 38 is connected to the controller 12 via the transmission path 7, and the internal port 39 is connected to the controller 13 via the transmission path 8. The data received through the internal ports are also detected by the switch circuit 15.

The port module 14 includes external ports 85 and 86, internal ports 83 and 84, and a switch circuit 82. The external ports 85 and 86 are ports for connecting external apparatuses external to the switch apparatus 1 and the port module 14 to each other. The external port 85 is connected to the storage apparatus 4, and the external port 86 is connected to the storage apparatus 5. The data received through the external ports are detected by the switch circuit 82.

The internal ports 83 and 84 are ports for connecting the port module 14 and the controllers 12 and 13 to each other in the switch apparatus 1. The internal port 83 is connected to the controller 12, and the internal port 84 is connected to the controller 13. The data received through the internal ports are also detected by the switch circuit 82. Each of the port modules 11 and 14 has the same structure and the same functions. Thus, in this embodiment, description is only made of the port module 11, and description of the port module 14 is omitted.

The switch circuit 15 determines through which port among the internal ports 38 and 39 or the external ports 34 and 35 data have been received. The switch circuit 15 switches data process contents in accordance with the port through which the data have been received. In a case where data have been received through the external port 34 or 35, the switch circuit 15 copies the received data, sends one copy of the copied data to another switch circuit via the transmission path 7, and sends another copy of the copied data to the other switch circuit via the transmission path 8 with a predetermined time period delay.

Meanwhile, in a case where data have been received through the internal port 38 or 39, the switch circuit 15 performs error detection on one copy of the data copied in another switch circuit. When the one copy of the copied data is normal, the switch circuit 15 outputs the data to the external. When the one copy of the copied data is abnormal, the switch circuit 15 performs error detection on another copy of the copied data. When the other copy of the copied data is normal, the switch circuit 15 outputs the data to the external. Detailed description of the switch circuit 15 is made later.

The controllers 12 and 13 for example set all the settings of, manage the state of, and control the operation of the switch apparatus 1. Each of the controllers 12 and 13 transfers data received from one port module to another port module corresponding to destination information included in the data.

The controller 12 includes a CPU (Central Processing Unit) 16 and a transfer circuit 17. The CPU 16 performs control of the operation of the transfer circuit 17. The transfer circuit 17 transfers date received from one of the port modules to another one of the port modules corresponding to the destination information included in the data.

The controller 13 includes a CPU 80 and a transfer circuit 81. The CPU 80 performs control of the operation of the transfer circuit 81. The transfer circuit 81 has the same functions as the transfer circuit 17. The transfer circuit 81 switches a destination port module of the received data in accordance with a command from the CPU 80.

In this embodiment, data is exchanged in frame units between a server apparatus and a storage apparatus. For example, when a command of reading certain data is sent from a server apparatus to a storage apparatus, the storage apparatus outputs data called a sequence in accordance with the reading command. Frames are obtained by dividing the sequence by a fixed data length and adding additional information thereto. Examples of the additional information include address information and header information. Detailed description of a frame structure is made later.

In the following, description is made of a procedure in which the storage apparatus 4 receives a frame A sent from the server apparatus 2 via the switch apparatus 1. The port module 11 receives the frame A from the server apparatus 2. The port module 11 generates frames Ax and Ay based on the received frame A.

The port module 11 sends the frame Ax to the controller 12 via the internal port 38. After confirming, based on the header information of the frame Ax, that the destination of the frame Ax is the port module 14, the controller 12 sends the received frame Ax to the port module 14. Among copied frames, frames to be precedingly sent are called preceding frames. Further, the port module 11 sends a frame Ay to the controller 13 via the internal port 39 after a predetermined time period has elapsed from sending of the preceding frame Ax. Among copied frames, frames to be subsequently sent are called subsequent frames. Sending-timing gap between the preceding frame Ax and the subsequent frame Ay enables distribution of receiving processes of the port module for receiving the frames Ax and Ay. After confirming, based on the header information of the subsequent frame Ay, that the destination of the frame Ay is the port module 14, the controller 13 sends the received subsequent frame Ay to the port module 14.

The port module 14 having received the preceding frame Ax through the port 83 performs an error checking process such as CRC (Cyclic Redundancy Check) for confirmation as to whether or not the received frame is normal. When normality of the preceding frame Ax is confirmed as a result of the error checking process, the port module 14 outputs the preceding frame Ax as the frame A to the storage apparatus 4.

When abnormality of the preceding frame Ax is confirmed as a result of the error checking process on the preceding frame Ax, the port module 14 performs another error checking process on the subsequent frame Ay received through the port 84. When normality of the subsequent frame Ay is confirmed as a result of the error checking process, the port module 14 outputs the subsequent frame Ay as the frame A to the storage apparatus 4. Detailed description of the process of the port module 14 is made later.

Figure 2:
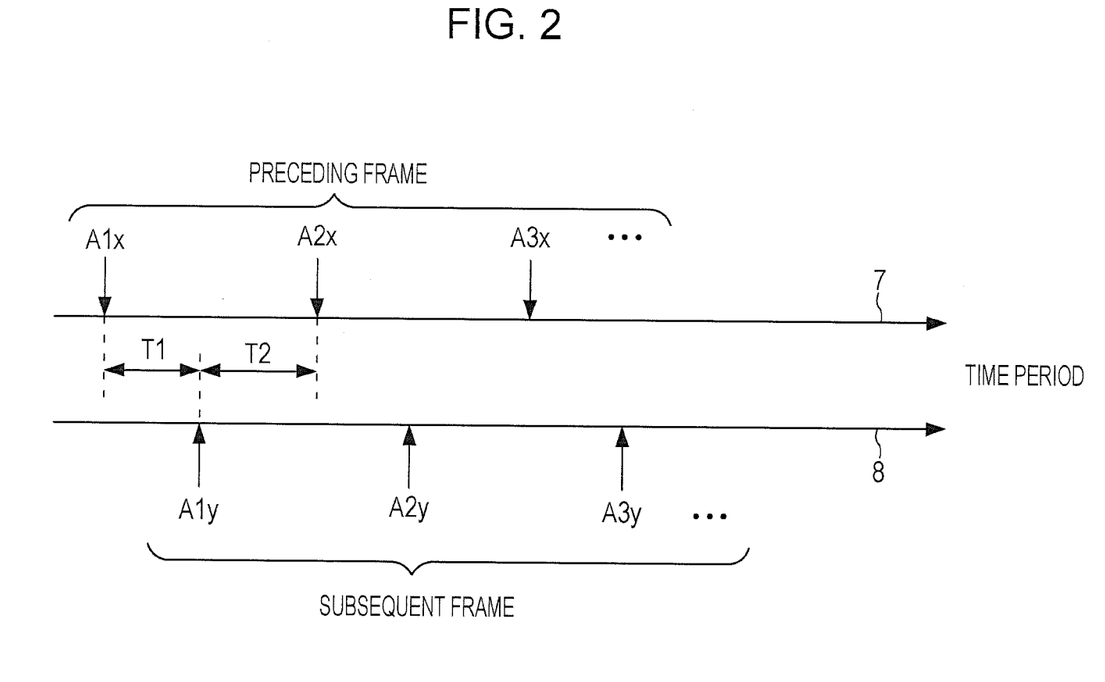
FIG. 2 is a timing chart for preceding frames and subsequent frames.

FIG. 2 is a timing chart for preceding frames and subsequent frames. Arrows 7 and 8 indicate the transmission paths 7 and 8 for transmitting the frames output from the port module 11, respectively. Arrows A1$x$, A2$x$, and A3$x$ indicate timings at which the port module 11 outputs preceding frames A1$x$, A2$x$, and A3$x$ to the transmission path 7, respectively. Arrows A1$y$, A2$y$, and A3$y$ indicate timings at which the port module 11 outputs subsequent frames A1$y$, A2$y$, and A3$y$ to the transmission path 8, respectively.

In FIG. 2, a time period T1 is a standby time period taken from after sending of the preceding frame A1$x$ to sending of the subsequent frame A1$y$ corresponding to the sent preceding frame A1$x$. In consideration of propagation errors in the transmission paths 7 and 8, a processing time gap between the controllers 12 and 13, and the like, the time period T1 is set so that the subsequent frame A1$y$ reaches the port module 14 after the preceding frame A1$x$ has reached the port module 14. That is, the time period T1 is a time period longer than the difference between a data-transmission time period taken for the data sent from the switch circuit 15 to reach the switch circuit 82 via the controller 12 for precedingly sending the data and a data-transmission time period taken for the data sent from the switch circuit 15 to reach the switch circuit 82 via the controller 13 for subsequently sending the data.

In FIG. 2, a time period T2 is a standby time period taken from after sending of the preceding subsequent frame A1y to sending of the subsequent preceding frame A2x. In consideration of propagation errors in the transmission paths 7 and 8, the processing time gap between the controllers 12 and 13, and the like, the time period T2 is set so that the subsequent preceding frame A2x reaches the port module 14 after the preceding subsequent frame A1y has reached the port module 14.

Setting of the time periods T1 and T2 as described above enables sending of frames to the external apparatuses external to the switch apparatus 1 without frame disordering in one sequence. Sending without frame disordering to the external apparatus eliminates the necessity of reordering the frames in the external apparatus and enables reduction of processing load in the external apparatus. Further, appropriate gaps in timing at which the port module receives frames enable distribution of processing timings such as those of the CRC checking process and a frame output process to the external in the port module on a receiving side.

Figure 3:
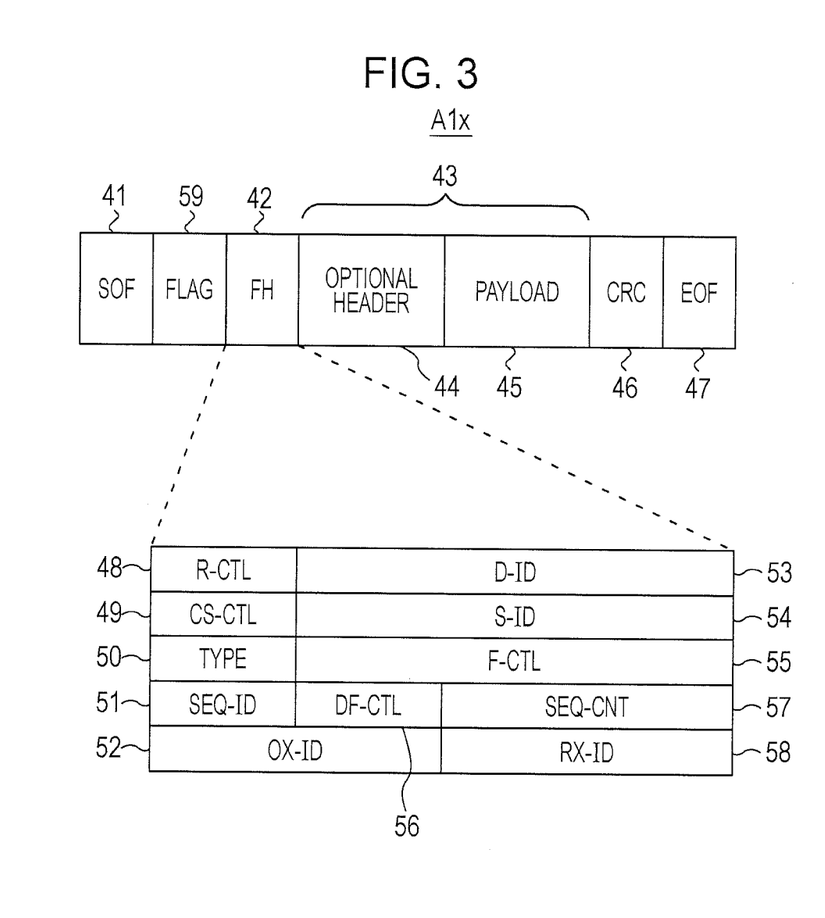
FIG. 3 is a format diagram of the preceding frame.

FIG. 3 is a format diagram of the preceding frame A1x. The preceding frame A1x is one of the frames included in the sequence. Each of the other preceding frames and subsequent frames has the same structure as the preceding frame A1x. The preceding frame A1x includes an SOF (Start of Frame Delimiter) 41, a flag 59, a FH (Frame Header) 42, an optional header 44, a payload 45, CRC 46, and an EOF (End of Frame Delimiter) 47.

The SOF 41 is a delimiter indicating a start position of the preceding frame A1x. The delimiter is a code indicating a break position between frames. The flag 59 is a flag inserted into a copied frame, and is an identifier used for distinguishing the preceding frame A1x and the subsequent frame A1y from each other. For example, the flag 59 of the preceding frame A1x has a logical value "1" and the flag 59 of the subsequent frame A1y has a logical value "0." Insertion of the flag 59 into each of the preceding frame A1x and the subsequent frame A1y enables the port module on the receiving side to identify whether the received frame is the preceding frame A1x or the subsequent frame A1y.

The FH 42 includes information of destination addresses of frames and a frame order in a sequence. Detailed description of the FH is made later. The optional header 44 and the payload 45 constitute a data field 43. The optional header 44 is a preliminarily provided header region. The payload 45 is a region for storing part of data for responding to a request from an external apparatus. The flag 59 may be provided in the region of the optional header 44. The CRC 46 is a check code for bit-error detection on the frame header and the data field. The EOF 47 is a delimiter indicating an end position of the preceding frame A1x.

The FH 42 is an identifier for identifying frames. The FH 42 includes R-CTL (Routing Control) 48, CS-CTL (Class Specific Control) 49, a TYPE (Data Structure Type) 50, an SEQ-ID (Sequence Identifier) 51, an OX-ID (Originator Exchange Identifier) 52, a D-ID (Destination Identifier) 53, an S-ID (Source Identifier) 54, F-CTL (Frame Control) 55, DF-CTL (Data Field Control) 56, an SEQ-CNT (Sequence Count) 57, and an RX-ID (Responder Exchange Identifier) 58.

The R-CTL 48 indicates a frame type such as a link-control frame, a link-data frame, and a data frame. The CS-CTL 49 indicates frame attribution and frame-sending priority. The TYPE 50 indicates a command code for link control when a frame is a link-control frame. The SEQ-ID 51 indicates a sequence to which a frame at the time of mixed transfer belongs. The OX-ID 52 is an exchange number issued by an originator. The D-ID 53 is a destination port address of a frame. The S-ID 54 is a source port address of a frame. The F-CTL 55 is used for control of a frame transfer sequence constituted by flags and codes. The DF-CTL 56 displays the presence or absence of the optional header and the length of the optional header in the case of using an optional header. The SEQ-CNT 57 displays a frame order in one sequence or a sequence order during the same exchange. The SEQ-CNT 57 is a unique number with which the preceding frame A1x is identified as one of frames. The RX-ID 58 displays an exchange number issued by a responder.

As described above, frames received from the external are copied in the switch apparatus 1 in a port module on a sending side, and the flag 59 is inserted thereinto. As a result, the port module on the receiving side can distinguish the preceding frame A1x and the subsequent frame A1y from each other.

Figure 4:
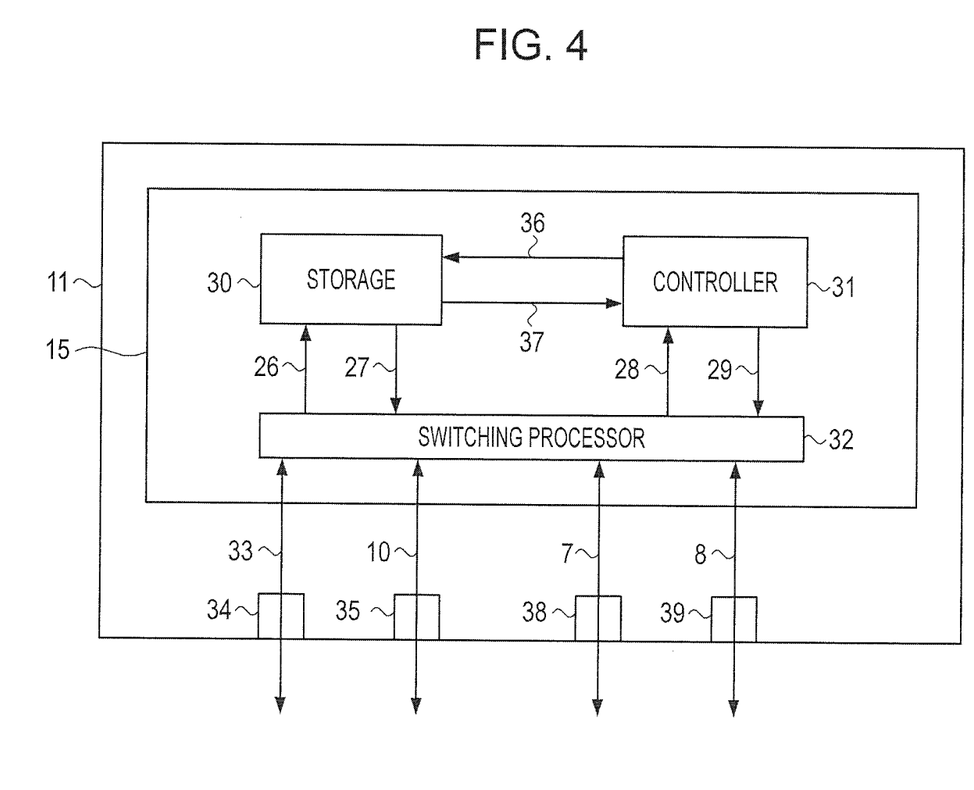
FIG. 4 is a specific block diagram of a port module.

FIG. 4 is a specific block diagram of the port module 11. As described above, the port module 11 includes the switch circuit 15, the external ports 34 and 35, and the internal ports 38 and 39. The switch circuit 15 has a storage 30, a controller 31, and a switching processor 32. Each of the other port modules 14, 87, 88, 89, and 90 has the same structure and functions as the port module 11, and hence description thereof is omitted.

The switch circuit 15 includes both a frame-sending function and a frame-receiving function. The switch circuit 15 executes different processes in accordance with the port through which frames are received: an internal port or an external port. Detailed description is made later of the process executed when frames are received through an internal port and the process executed when frames are received through an external port.

The switching processor 32 detects through which port among the external ports 34 and 35 or the internal ports 38 and 39 frames have been received. The switching processor 32 sends, as a detection signal 28, a detection result to the controller 31. The switching processor 32 writes, as frames 26, the received frames into the storage 30. In accordance with a control signal 29 received from the controller 31, the switching processor 32 outputs frames 27 read out from the storage 30 to any of the external ports 34 and 35 and the internal ports 38 and 39.

The storage 30 stores the frames written thereinto from the switching processor 32. The storage 30 makes control information for managing a sent state or a received state of the preceding frames and the subsequent frames correspond to frame identification information and stores the control information. In accordance with a control signal 36 received from the controller 31, the storage 30 outputs, as the frames 27, the stored frames to the switching processor 32. After outputting the stored frames, the storage 30 outputs a notification signal 37 to the controller 31 in response to the control signal 36 received from the controller 31.

The controller 31 controls the storage 30 and the switching processor 32 in accordance with the detection signal 28 received from the switching processor 32. Based on the control signal 29, the controller 31 controls the internal ports for outputting the frames. Based on the control signal 36, the controller 31 controls read-out timings of the frames stored in the storage 30.

In the following, with reference to the flow chart of FIG. 5, description is made of sending operations of the preceding frames and the subsequent frames in the port module 11. Further, with reference to the flow chart of FIG. 6, description is made of receiving operations of the preceding frames and the subsequent frames in the port module 11. Each of the other port modules has the same structure and functions as the port module 11, and hence description thereof is omitted.

Figure 5:
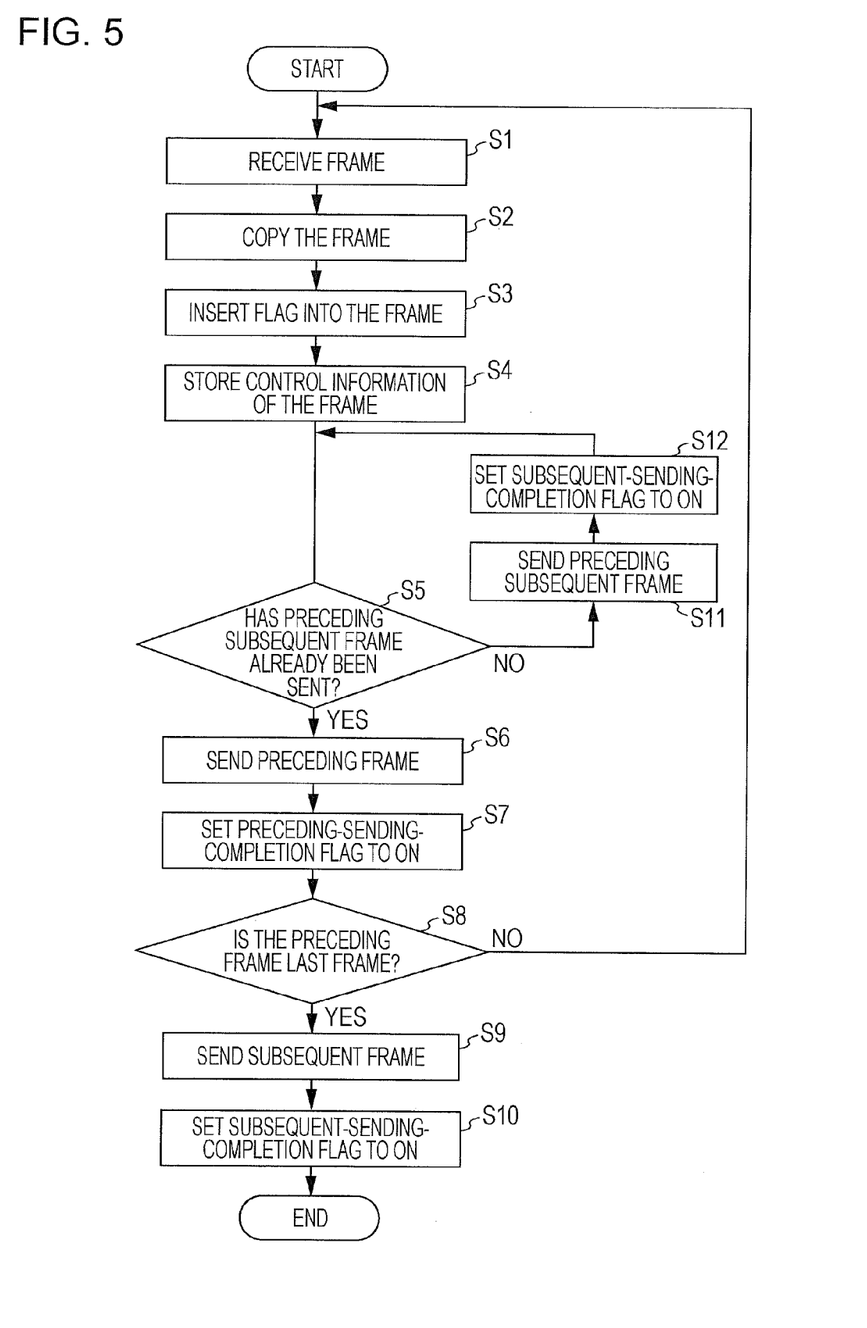
FIG. 5 is a flow chart of a switch circuit at the time of sending frames.

FIG. 5 is a flow chart showing a process of the switch circuit 15 when the port module 11 sends frames received from an external apparatus to another port module. When a frame from the external apparatus is received through the external port 34 or 35, the switching processor 32 of the switch circuit 15 detects reception of the frame through the external port, and sends the detection signal 28 to the controller 31 (S1).

The switching processor 32 writes, as the frame 26, the received frame into the storage 30. The storage 30 stores the written-in frame 26. The controller 31 having received the detection signal 28 notifying reception of the frame through the external port copies the frame 26 stored in the storage 30 to another address (S2).

The controller 31 inserts the flag 59 into each of the copied frames as illustrated in FIG. 3 (S3). Specifically, as described above, in order that the preceding frames and the subsequent frames can be distinguished from each other, the controller 31 inserts the flags 59 having logical values different from each other into the copied frames, respectively.

The controller 31 makes the storage 30 store control information of each frame, which is information notifying whether or not a preceding frame and a subsequent frame have already been sent (S4). The control information is stored, as a management table for managing the sent state of the frames, in the storage 30. The control information of each of the frames is stored in the management table together with the FH 42 as the identification information corresponding to each of the frames. The management table is not required to store all information of the FH 42, and may store only information required for identification of the frames. The control information includes a flag for indicating whether or not the preceding frame and the subsequent frame have already been sent. The port module 11 has not yet sent any frame at the time of generation of the control information, and hence sending-completion flags of both the preceding frame and the subsequent frame indicate OFF. Detailed description of the control information is made later.

The controller 31 refers to the control information stored in the storage 30, and determines, prior to sending of a preceding frame, based on a flag value of the control information whether or not a preceding subsequent frame has already been sent (S5). In a case where the preceding subsequent frame has already been sent or there is no preceding subsequent frame (S5: YES), the controller 31 sends, to the storage 30, the control signal 36 for reading out a subsequent preceding frame. The storage 30 having received the control signal 36 outputs a stored preceding frame to the switching processor 32. The controller 31 send the control signal 29 to the switching processor 32 so that the frame 27 read out from the storage 30 is sent via any of the internal ports 38 and 39 (S6).

The storage 30 having output the preceding frame outputs the notification signal 37 to the controller 31. The controller 31 having received the notification signal 37 outputs the control signal 36 for setting the sending-completion flag of the preceding frame to ON to the storage 30 (S7), the flag being stored in the control information. After confirming, by the notification signal 37, that the preceding frame has already been sent, the controller 31 sends the control signal 36 for sending a subsequent frame to the storage 30. In this manner, the frame order in one sequence can be maintained.

In a case where a preceding subsequent frame has not yet been sent (S5: NO), the controller 31 sends the control signal 36 to the storage 30 so that a preceding subsequent frame is output (S11). The storage 30 having output the preceding subsequent frame outputs the notification signal 37 for notifying frame-sending completion to the controller 31. The controller 31 having received the notification signal 37 sets the sending-completion flag of the preceding subsequent frame to ON in the control information stored in the storage 30 (S12).

The controller 31 refers to the FH 42 of the sent preceding frame, and determines whether or not the sent preceding frame is the last frame of a sequence to which the sent preceding frame belongs (S8). When the sent preceding frame is the last frame (S8: YES), the controller 31 sends the control signal 36 to the storage 30 so that a subsequent frame is sent after a predetermined time period has elapsed from output of the preceding frame. The storage 30 having received the control signal 36 outputs a subsequent frame to the switching processor 32 (S9). After outputting the subsequent frame, the storage 30 outputs the notification signal 37 to the controller 31, the signal notifying that the subsequent frame has been sent. The controller 31 having received the notification signal 37 sends the control signal 29 to the switching processor 32 so that the subsequent frame is sent to another of the internal ports 38 and 39 via which the preceding frame is sent. The switching processor 32 having received the control signal 29 sends the received subsequent frame to the internal port specified by the controller 31.

The controller 31 having received the notification signal 37 notifying output of the subsequent frame from the storage 30 sets the sending-completion flag of the subsequent frame in the control information to ON (S10).

When the preceding frame is determined not to be the last frame in Step S8 (S8: NO), the switch circuit 15 repeats the frame-sending process from Step S1.

The process as described above on frames received from the external apparatus enables the switch circuit 15 to send preceding frames and subsequent frames at different timings to different transmission paths in the switch apparatus 1.

Figure 6:
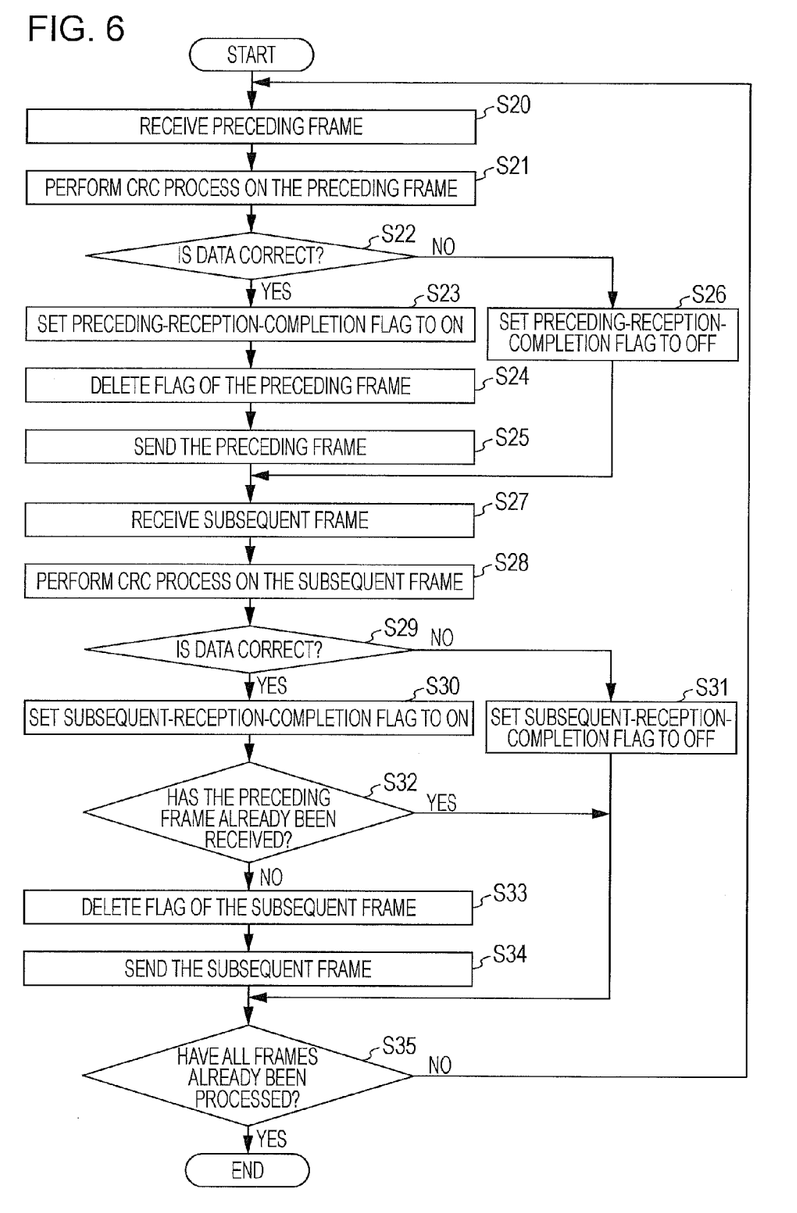
FIG. 6 is a flow chart of the switch circuit at the time of receiving frames.

FIG. 6 is a flow chart of a process of the switch circuit 15 at the time of sending frames received from another module in the switch apparatus 1 to the external of the switch apparatus 1. Note that, in this embodiment, the switch circuit in each of all the port modules has the same structure and functions as the switch circuit 15. Thus, description thereof is omitted. Further, in FIG. 6, values of both a preceding-reception-completion flag and a subsequent-reception-completion flag indicate OFF.

When a frame is received through the internal port 38 or 39 from another port module, the switching processor 32 of the switch circuit 15 detects that the frame is received through the internal port. Then, the switching processor 32 sends the detection signal 28 to the controller 31. The switching processor 32 sends the received frame 26 to the storage 30. The controller 31 reads out the flag 59 stored in the storage 30. Based on the read-out flag 59, the controller 31 recognizes that the frame written into the storage 30 is a preceding frame (S20).

Based on the CRC 46 of the preceding frame, the controller 31 performs a CRC process as an error checking process on the data stored in the data field 43 of the preceding frame (S21).

In a case of having determined that the data of the preceding frame is correct as a result of the CRC (S22: YES), the controller 31 writes the control information in which the preceding-reception-completion flag indicates ON into the storage 30 (S23). With reference to the value of the preceding-reception-completion flag, the controller 31 can confirm whether or not the data of the received preceding frame is correct.

The controller 31 deletes the flag 59 of the preceding frame (S24). The controller 31 outputs the control signal 36 to the storage 30 so that the frame 27 from which the flag 59 is deleted is sent to the switching processor 32. The controller 31 outputs the control signal 29 to the switching processor 32 so that the received frame 27 is sent to any of the external ports 34 and 35. The switching processor 32 having received the control signal 29 outputs the received frame 27 to any of the external ports 34 and 35 (S25).

Meanwhile, in a case of having determined that the data of the preceding frame has an error, or a case of not having received the preceding frame (S22: NO), the controller 31 maintains the preceding-reception-completion flag indicating OFF as it is.

Next, the switching processor 32 receives a frame from the internal port 38 or 39. The switching processor 32 having received the frame from the internal port sends the detection signal 28 to the controller 31. The switching processor 32 sends the received frame 26 to the storage 30. The controller 31 reads out the flag 59 stored in the storage 30. Based on the red-out flag 59, the controller 31 recognizes that the frame stored in the storage 30 is a subsequent frame (S27).

Based on the CRC 46 of the subsequent frame stored in the storage 30, the controller 31 performs a CRC process on the data of the data field 43 (S28).

In a case of having determined that the data of the subsequent frame is correct as a result of the error checking (S29: YES), the controller 31 rewrites the control information stored in the storage 30 so that the subsequent-reception-completion flag is set to ON (S30).

Meanwhile, in a case of having determined that the data of the subsequent frame has an error as a result of the error checking (S29: NO), the controller 31 rewrites the control information stored in the storage 30 so that the subsequent-reception-completion flag is set to OFF (S31). When the value of the subsequent-reception-completion flag indicates OFF, the controller 31 can confirm that correct data of the subsequent frame have not been received.

After receiving a subsequent frame having correct data, the controller 31 refers to the control information stored in the storage 30. When the preceding-reception-completion flag in the control information indicates ON (S32: YES), the controller 31 determines that the preceding frame has already been sent to the external, and performs processes of and after Step S35. Meanwhile, when the preceding-reception-completion flag in the control information indicates OFF (S32: NO), the controller 31 determines that the preceding frame has not yet been sent to the external, and deletes the flag 59 of the subsequent frame (S33). The controller 31 sends the control signal 36 to the storage 30 so that the subsequent frame from which the flag 59 is deleted is sent to the switching processor 32. Further, the controller 31 outputs the control signal 29 to the switching processor 32 so that the frame 27 received from the storage 30 is output to the external apparatus from the external port 34 or 35 (S34).

In this embodiment, when both the preceding-sending-completion flag and the subsequent-sending-completion flag indicate OFF, the frames are not to be sent to the external apparatus.

The controller 31 reads out the FH 42 of the subsequent frame stored in the storage 30. The controller 31 refers to the FH 42 and confirms whether or not all the frames have been processed (S35). In a case where all the frames have already been processed (S35: YES), the switch circuit 15 ends the frame-receiving processes. Meanwhile, in a case where not all the frames have been processed (S35: NO), the switch circuit 15 returns to Step S20 and starts a receiving process of the next preceding frame (S20).

The processes as described above on frames received from another port module enable the switch circuit 15 to send frames of received preceding frames or received subsequent frames to the external apparatus connected to the external of the switch apparatus 1, the sent frames having been able to receive correct data.

Note that, in the embodiment shown in FIG. 6, the receiving process of the subsequent frame is performed after the receiving process of the preceding frame. However, in a case where a subsequent frame has been received prior to reception of a preceding frame, the process may be started from Step S27. Starting of the process from Step S27 enables the controller 31 to perform the receiving process of the subsequent frame without reception of the preceding frame.

Figure 7A:
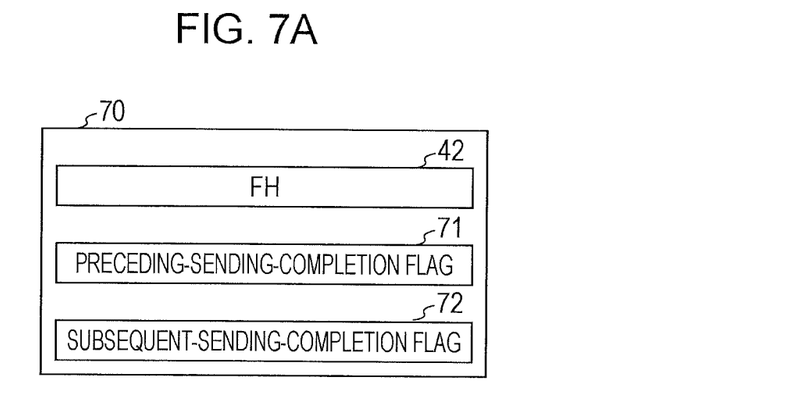
FIG. 7A is a table chart of control information stored in the port module for sending frames.
Figure 7B:
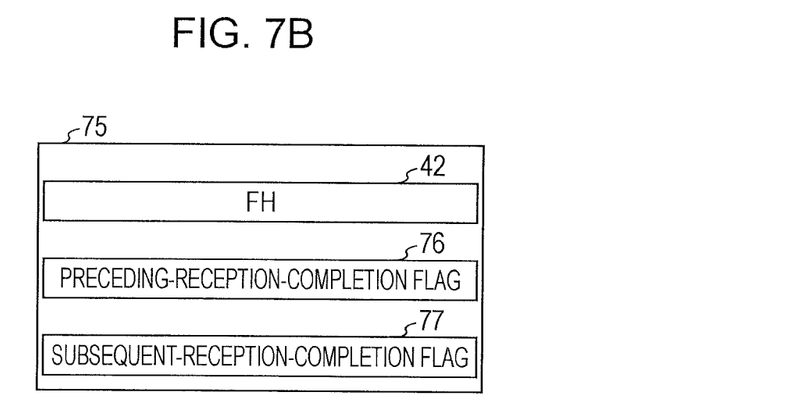
FIG. 7B is a table chart of control information stored in the port module for receiving frames.

FIG. 7A is a table chart of a control information table stored in the port module for sending frames. FIG. 7B is a table chart of a control information table stored in the port module for receiving the frames.

In this embodiment, a control information table 70 illustrated in FIG. 7A is stored in the storage 30 included in the port module 11 on the frame-sending side. The controller 31 generates the control information table 70 and stores the same into the storage 30.

The control information table 70 includes the FH 42, a preceding-sending-completion flag 71, and a subsequent-sending-completion flag 72. The FH 42 is obtained by copying the FH 42 of a frame received from the external apparatus.

The preceding-sending-completion flag 71 is a flag indicating whether or not a preceding frame has already been sent. For example, it can be determined that the preceding frame has already been sent when a value of the preceding-sending-completion flag 71 is "1," and that the preceding frame has not yet been sent when the value of the preceding-sending-completion flag 71 is "0."

The subsequent-sending-completion flag 72 is a flag indicating whether or not a subsequent frame has already been sent. For example, it can be determined that the subsequent frame has already been sent when a value of the subsequent-sending-completion flag 72 is "1," and that the subsequent frame has not yet been sent when the value of the subsequent-sending-completion flag 72 is "0."

In this embodiment, a control information table 75 illustrated in FIG. 7B is stored in the storage 30 included in the port module 14 on the frame-sending side. The controller 31 generates the control information table 75 and stores the same into the storage 30.

The control information table 75 includes the FH 42, a preceding-reception-completion flag 76, and a subsequent-reception-completion flag 77. The FH 42 is obtained by copying the FH 42 of a frame received from the external apparatus.

The preceding-reception-completion flag 76 is a flag indicating whether or not a preceding frame has already been received. For example, it can be determined that the preceding frame has already been received when a value of the preceding-reception-completion flag 76 is "1," and that the preceding frame has not yet been received when the value of the preceding-reception-completion flag 76 is "0."

The subsequent-reception-completion flag 77 is a flag indicating whether or not a subsequent frame has already been received. For example, it can be determined that the subsequent frame has already been received when a value of the subsequent-reception-completion flag 77 is "1," and that the subsequent frame has not yet been received when the value of the subsequent-reception-completion flag 77 is "0."

Storing as described above of the control information tables respectively in the port modules on the frame-sending side and the frame-receiving side enables management of exchange of preceding frames and subsequent frames which propagate through different transmission paths between port modules at different timings.

The invention claimed is:

1. A switch apparatus comprising: a first switch circuit to receive frame data sent from a first device, to send first frame data created based on the received frame data and including the received frame data, and to send second frame data created based on the received frame data and including the received frame data after a predetermined time period elapses from sending of the first frame data; a first controller to output the first frame data received from the first switch circuit; a second controller to output the second frame data received from the first switch circuit; and a second switch circuit to: receive the first frame data from the first controller and second frame data received from the second controller, determine whether each of the first frame data created and the second frame data created has an error, send the received frame data in the first data to a second device when determining that the first frame data created is free from an error, send the received frame data in the second frame data-to the second device when determining that the first frame data created has an error and when determining that the second frame data created is free from an error, and prevent sending of the second frame data to the second device when the received frame data in the first frame data is sent to the second device.

2. The switch apparatus according to claim 1, wherein the predetermined time period is a time period longer than a difference between a data-transmission time period for transmitting the first frame data from the first switch circuit to the second switch circuit via the first controller and a data-transmission time period for transmitting the second frame data from the first switch circuit to the second switch circuit via the second controller.

3. The switch apparatus according to claim 1, wherein the first switch circuit includes a storage to store the received frame data storage, adds a first identifier to the received frame data to generate the first frame data, the first identifier identifying the first frame data, and adds a second identifier to the received frame data to generate the second frame data, the second identifier identifying the second frame data.

4. The switch apparatus according to claim 3, wherein the first switch circuit stores identification information identifying the stored frame data in association with control information which indicates that the stored frame data has already been sent, and wherein the first switch sends next frame data after confirming that the stored frame data has already been sent based on the control information.

5. A method executed by a switch apparatus including a first switch circuit, a second switch circuit, a first controller, and a second controller, the method comprising: receiving frame data sent from a first device by the first switch circuit; sending first frame data created based on the received frame data and including the received frame data to the first controller by the first switch circuit; sending second frame data created based on the received frame data and including the received frame data to the second controller after a predetermined time period elapses from sending of the first frame data by the first switch circuit; transferring the first frame data sent from the first switch circuit to the second switch circuit by the first controller; transferring the second frame data sent from the first switch circuit to the second switch circuit by the second controller; receiving the first frame data sent from the first controller and the second frame data sent from the second controller by the second switch circuit; determining, using the second switch circuit, whether each of the first frame data created and the second frame data created has an error; sending the received frame data in the first frame data to the second device by the second switch circuit when determining that the first frame data created is free from an error;

and sending the received frame data in the second frame data to the second device by the second switch circuit when determining that the first frame data created has an error and when the second frame data created is free from an error, and wherein the sending of the second frame data is prevented when the received frame data in the first frame data is sent to the second device.

6. The method of claim 5, wherein the predetermined time period is a time period longer than a difference between a data-transmission time period for transmitting the first frame data from the first switch circuit to the second switch circuit via the first controller and a data-transmission time period for transmitting the second frame data from the first switch circuit to the second switch circuit via the second controller.

* * * * *

UNITED STATES PATENT AND TRADEMARK OFFICE
CERTIFICATE OF CORRECTION

PATENT NO. : 8,625,585 B2  
APPLICATION NO. : 13/032095  
DATED : January 7, 2014  
INVENTOR(S) : Masaki Page 1 of 1

It is certified that error appears in the above-identified patent and that said Letters Patent is hereby corrected as shown below:

In the Claims

Column 11, Line 28, In Claim 1, delete "data-to" and insert -- data to --, therefor.
Column 11, Line 44, In Claim 3, delete "frame data storage," and insert -- frame data, --, therefor.

Signed and Sealed this
Twenty-ninth Day of April, 2014

Michelle K. Lee
*Deputy Director of the United States Patent and Trademark Office*